(No Model.) 2 Sheets—Sheet 2.
A. C. OEHRLE.
ELEVATED RAILROAD AND CONDUIT FOR ELECTRIC WIRES, &c.
No. 379,904. Patented Mar. 20, 1888.
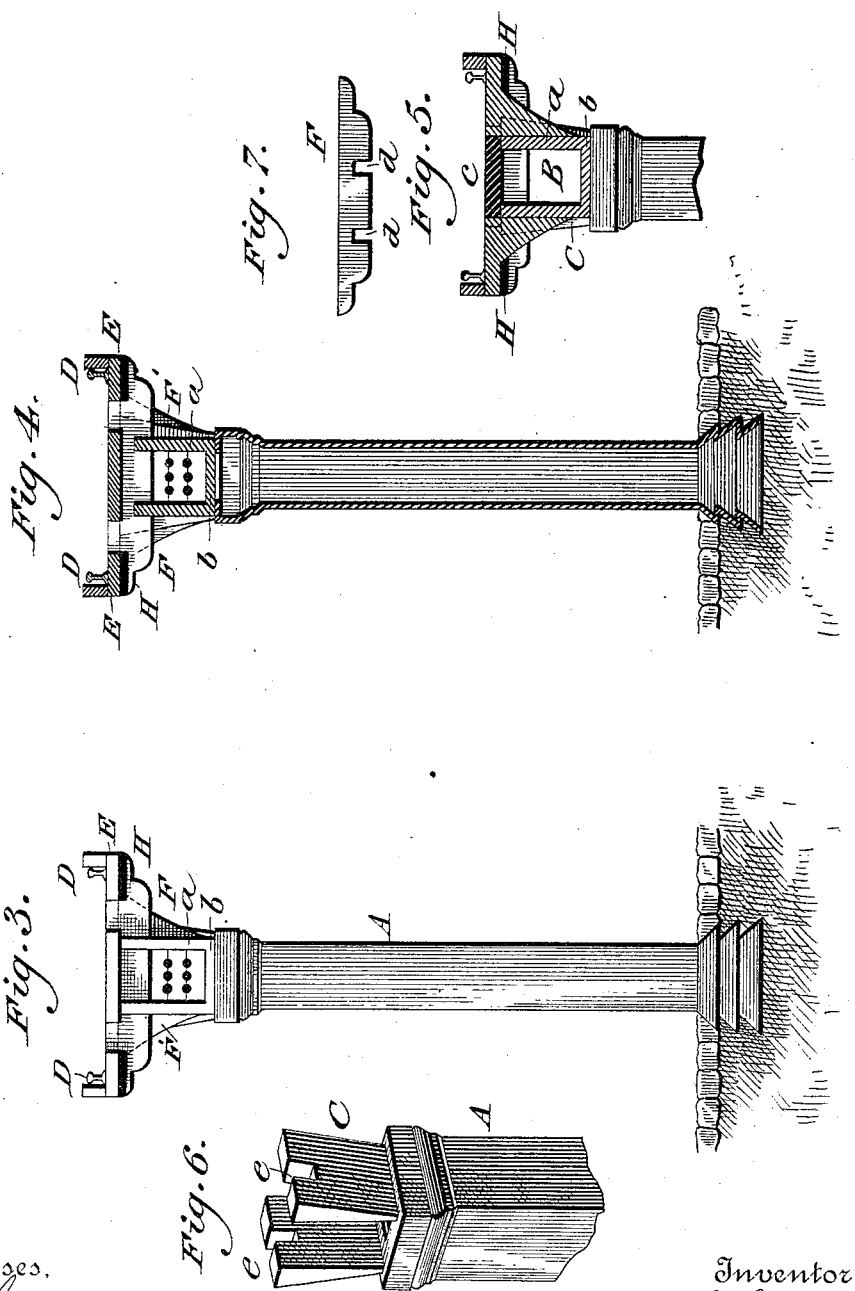

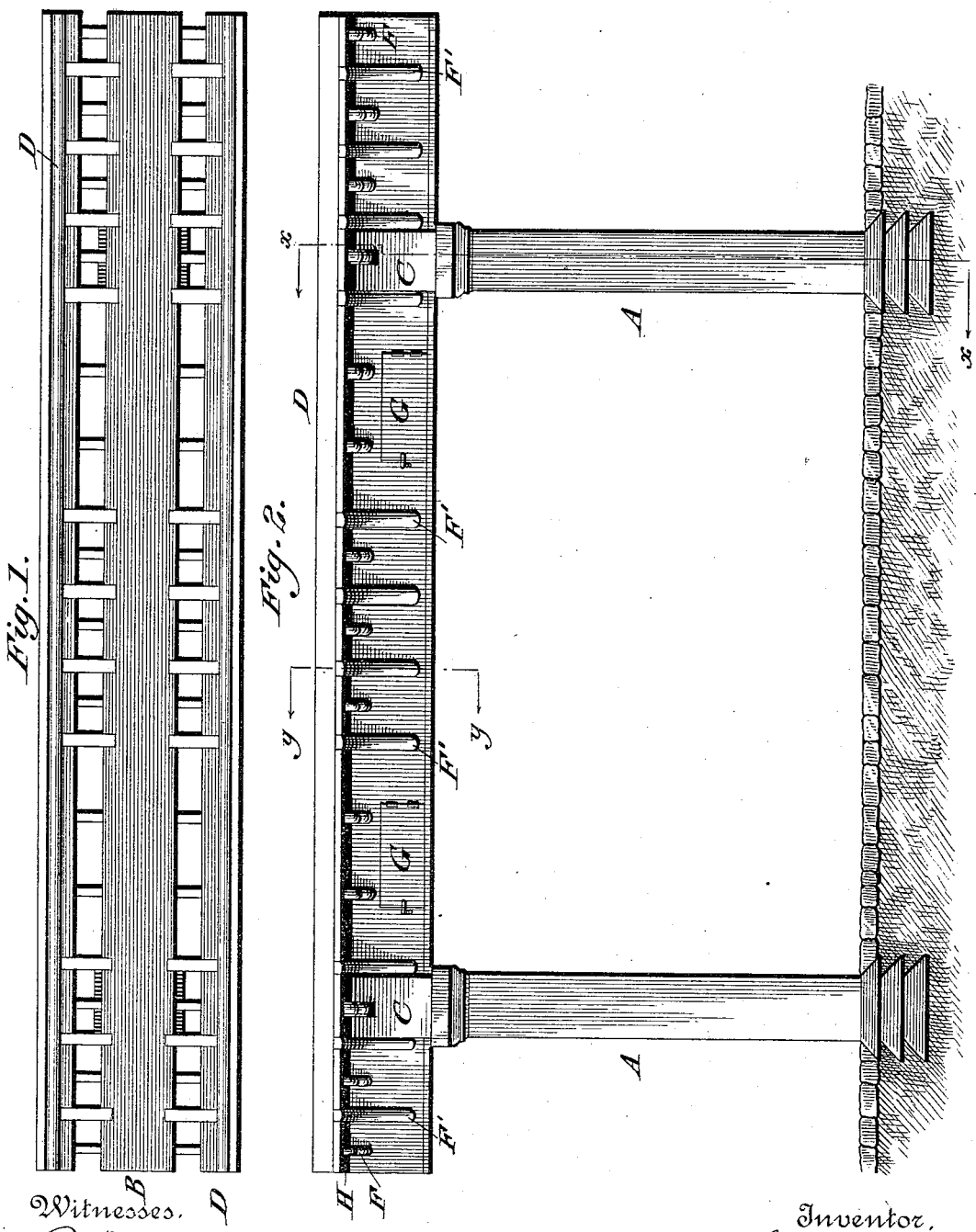

UNITED STATES PATENT OFFICE.

ALBERT C. OEHRLE, OF PHILADELPHIA, PENNSYLVANIA, ASSIGNOR TO THE AMERICAN PNEUMATIC RAILWAY COMPANY, OF TENNESSEE.

ELEVATED RAILROAD AND CONDUIT FOR ELECTRIC WIRES, &c.

SPECIFICATION forming part of Letters Patent No. 379,904, dated March 20, 1888.

Application filed June 23, 1887. Serial No. 242,236. (No model.)

*To all whom it may concern:*

Be it known that I, ALBERT C. OEHRLE, a citizen of the United States, residing in the city and county of Philadelphia, State of Pennsylvania, have invented a new and useful Improvement in Elevated Railroad and Conduits for Electric Wires, &c., which improvement is fully set forth in the following specification and accompanying drawings.

My invention consists of a combined elevated railroad and conduit for electric wires, &c., as herein set forth.

It also consists of a novel manner of constructing the conduit and firmly connecting the same with a railroad.

It also consists of novel means for deadening the sound of trains passing over the road.

Figure 1 represents a top or plan view of an elevated railroad and conduit embodying my invention. Fig. 2 represents a side elevation thereof. Fig. 3 represents an end elevation thereof. Fig. 4 represents a vertical section in line $x\,x$, Fig. 2. Fig. 5 represents a vertical section of a portion in line $y\,y$, Fig. 2. Fig. 6 represents a perspective view of the upper portion of one of the columns thereof. Fig. 7 represents a view of one of the cross-ties detached.

Similar letters of reference indicate corresponding parts in the several figures.

Referring to the drawings, A represents columns, which are properly supported or anchored.

B represents a conduit for electric wires, and, if desired, for gas, water, or other pipes, the same being of the form of a box or tube, consisting of the sides $a$, the bottom or floor $b$, and roof $c$. The conduit is supported on the columns A, and the latter have upward extensions C, forming forks which embrace the sides of the conduit, thereby preventing lateral displacement or shifting of the conduit.

D represents railroad-rails, which are supported on stringers E, the latter resting on cross-ties F and brackets F′, the latter being firmly secured to the sides of the conduit and the former being removably sustained on the top of the sides of the conduits, and having rabbets $d$, which interlock with the said sides, whereof the latter are prevented from lateral springing in lateral direction. When the cross-ties occupy positions above the columns A, the upper ends of the extensions are rabbeted, as at $e$, to receive the ties, and the ties may also interlock with said extensions to prevent lateral springing thereof. The extensions also fit snugly between adjacent brackets F′, and thus the conduit is braced and rendered strong and durable and firmly connected with the columns.

The sides of the conduit are provided with doors G, affording access to the wires, pipes, &c., within the conduit for purposes of laying said wires, &c., repairs, connections, &c.

Interposed between the stringers E and ties F and brackets F′ is packing, H, of soft flexible or elastic material, whereby the noise occasioned by the passing of cars or trains on the track is deadened or reduced.

Having thus described my invention, what I claim as new, and desire to secure by Letters Patent, is—

1. In a combined elevated railroad and conduit, the column A, having the extension C, in combination with the conduit B, substantially as and for the purpose set forth.

2. The cross-ties of a railroad, in combination with a conduit for electric wires, &c., said ties being removably sustained on the conduit, substantially as described.

3. A railroad, in combination with a conduit, the cross-ties being interlocked with the walls of the conduit by means of joints, substantially as described.

4. In a combined elevated railroad and conduit, the column A, having the extensions C, rabbeted at $e$, in combination with the cross-ties F, substantially as described.

5. In a combined elevated railroad and conduit, the column A, having the extensions C, rabbeted at $e$, in combination with the conduit B and the cross-ties F, having recesses $d\,d$, substantially as and for the purpose set forth.

6. In a combined elevated railroad and conduit, the column A, having the extensions C C, in combination with the conduit B, the brackets F′, the cross-ties F, and stringer E, with rails thereon, substantially as described.

7. The columns A, having extensions C, rabbeted at e, in combination with the conduit B, cross-tie F, recessed at d d, the brackets F', the stringers E, and rails D, substantially as described.

8. In a combined elevated railroad and conduit, columns having extensions thereon, a conduit located between said extensions, cross-ties resting on said conduit and extensions, stringers resting on packing between the same, and the cross-ties and rails on said stringers, said parts combined substantially as and for the purpose set forth.

ALBERT C. OEHRLE.

Witnesses:
JOHN A. WIEDERSHEIM,
JAS. F. KELLY.